United States Patent
Giladi

(10) Patent No.: US 9,628,531 B2
(45) Date of Patent: Apr. 18, 2017

(54) SYSTEMS AND METHODS FOR CONTROLLING CLIENT BEHAVIOR IN ADAPTIVE STREAMING

(71) Applicant: FutureWei Technologies, Inc., Plano, TX (US)

(72) Inventor: Alexander Giladi, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 490 days.

(21) Appl. No.: 13/870,736

(22) Filed: Apr. 25, 2013

(65) Prior Publication Data

US 2013/0290556 A1 Oct. 31, 2013

Related U.S. Application Data

(60) Provisional application No. 61/638,276, filed on Apr. 25, 2012.

(51) Int. Cl.

| | |
|---|---|
| *G06F 15/16* | (2006.01) |
| *H04L 29/06* | (2006.01) |
| *H04L 29/08* | (2006.01) |
| *H04N 21/234* | (2011.01) |
| *H04N 21/81* | (2011.01) |
| *G06Q 30/00* | (2012.01) |

(52) U.S. Cl.
CPC ............ *H04L 65/60* (2013.01); *H04L 65/604* (2013.01); *H04L 65/608* (2013.01); *H04L 67/02* (2013.01); *H04N 21/23424* (2013.01); *H04N 21/812* (2013.01)

(58) Field of Classification Search
CPC ....... H04L 65/60; H04L 67/02; H04L 65/604; H04L 65/608; H04N 21/23424; H04N 21/812

USPC .......................................... 709/231; 705/14.4
See application file for complete search history.

(56) References Cited

U.S. PATENT DOCUMENTS

| | | | | |
|---|---|---|---|---|
| 8,601,149 | B2* | 12/2013 | Ando | G11B 20/00086 709/231 |
| 8,935,424 | B2* | 1/2015 | Bouazizi | H04L 65/4084 709/219 |

(Continued)

OTHER PUBLICATIONS

Christopher Muller, Christian Timmerer. A Test-Bed for the Dynamic Adaptive Streaming over HTTP featuring Session Mobility. Proceedings of the second annual ACM. 2011, MMSys'11, Feb. 23-25, 2011.*

(Continued)

*Primary Examiner* — Edward Kim
*Assistant Examiner* — Vitali Korobov
(74) *Attorney, Agent, or Firm* — Slater Matsil, LLP

(57) ABSTRACT

System and method embodiments are provided for controlling end client behavior in dynamic adaptive streaming over hypertext transfer protocol (HTTP) (DASH). In an embodiment, the method includes receiving, at the end client, a DASH Motion Picture Experts Group (MPEG)-2 stream (TS) segment, wherein the DASH MPEG-2 TS segment includes segmentation descriptors, and performing, with the end client, an action, such as a media presentation description (MPD) reload, indicated by the segmentation descriptor. In an embodiment, the segmentation descriptor conforms to a Society of Cable Telecommunications Engineers (SCTE) 35 protocol or a HTTP live streaming (HLS) protocol.

20 Claims, 3 Drawing Sheets

(56) References Cited

U.S. PATENT DOCUMENTS

| | | | | |
|---|---|---|---|---|
| 2007/0079001 | A1* | 4/2007 | Ando | G11B 20/10527 709/231 |
| 2010/0169303 | A1 | 7/2010 | Biderman et al. | |
| 2010/0312905 | A1 | 12/2010 | Sandmann et al. | |
| 2011/0103287 | A1 | 5/2011 | Ma et al. | |
| 2011/0119395 | A1* | 5/2011 | Ha | H04L 47/2416 709/231 |
| 2011/0231569 | A1 | 9/2011 | Luby et al. | |
| 2012/0042090 | A1* | 2/2012 | Chen | H04L 65/607 709/231 |
| 2012/0233345 | A1* | 9/2012 | Hannuksela | H04N 21/26258 709/231 |
| 2012/0259994 | A1* | 10/2012 | Gillies | H04L 12/1881 709/231 |
| 2013/0103849 | A1* | 4/2013 | Mao | H04N 21/8456 709/231 |

OTHER PUBLICATIONS

RGB Network. White Paper. Adaptive Streaming Ad Insertion: Modifying Playlists to Deliver Targeted Ads Using HTTP Adaptive Streaming. 2011.*

International Search Report and Written Opinion of the International Searching Authority received in Patent Cooperation Treaty Application No. PCT/US13/41716, mailed Jul. 25, 2013, 8 pages.

"Digital Program Insertion Cueing Message for Cable," American National Standard, ANSI/SCTE 35, 2012, 44 pages, Society of Cable Telecommunications Engineers, Engineering Committee, Digital Video Subcommittee.

ISO/IEC 23009-1, Information Technology—Dynamic Adaptive Streaming Over HTTP (DASH)—Part 1: Media Presentation Description and Segment Formats, First Edition, Apr. 1, 2012, 134 pages.

Pantos, R. et al. "HTTP Live Streaming draft-pantos-http-live-streaming-10," Informational Internet Draft, Oct. 15, 2012, 38 pages, Apple Inc.

Giladi, A. et al., "ISO/IEC FDIS 23009-4," International Organisation for Standardisation, Organisation Internationale de Normalisation, ISO/IEC JTC1/SC29/WG11, Coding of Moving Pictures and Audio, Jan. 2013, 34 pages, Geneva, Switzerland.

"Adaptive Streaming Ad Insertion Modifying Playlists to Deliver Targeted Ads Using HTTP Adaptive Streaming," RGB Network, White Paper, retrieved from the internet:<URL: http.rgbnetworks. com/pdfs/Adaptive_Birate_Ad_Insertion_White_Paper_0911-01.pdf>, 2011, pp. 1-8.

International Search Report and Written Opinion of the International Searching Authority received in Patent Cooperation Treaty Application No. PCT/US2013/038272, mailed Sep. 27, 2013, 9 pages.

Mueller, C. et al., "A Test-Bed for the Dynamic Adaptive Streaming over HTTP featuring Session Mobility," Proceedings of the second annual ACM, retrieved from the internet: <URL: http://www-itec.uni-klu.as.at/bib/files/mueller_A_Test_Bed_for_DASH_featurning_Session_Mobility.pdf>, Feb. 23-25, 2011, 5 pages.

\* cited by examiner

200

| SEGMENTATION MESSAGE | segmentation_type_id | END OF PERIOD | MPD RELOAD |
|---|---|---|---|
| NOT INDICATED | 0x00 | | |
| CONTENT IDENTIFICATION | 0x01 | | |
| PROGRAM START | 0x10 | Y | |
| PROGRAM END | 0x11 | Y | |
| PROGRAM EARLY TERMINATION | 0x12 | | Y |
| PROGRAM BREAKAWAY | 0x13 | | Y |
| PROGRAM RESUMPTION | 0x14 | | Y |
| PROGRAM RUNOVER PLANNED | 0x15 | | |
| PROGRAM RUNOVER UNPLANNED | 0x16 | | Y |
| PROGRAM OVERLAP START | 0x17 | | Y |
| CHAPTER START | 0x20 | Y | |
| CHAPTER END | 0x21 | Y | |
| PROVIDER ADVERTISEMENT START | 0x30 | Y | |
| PROVIDER ADVERTISEMENT END | 0x31 | Y | |
| DISTRIBUTOR ADVERTISEMENT START | 0x32 | Y | |
| DISTRIBUTOR ADVERTISEMENT END | 0x33 | Y | |
| PLACEMENT OPPORTUNITY START | 0x34 | Y | |
| PLACEMENT OPPORTUNITY END | 0x35 | Y | |
| Unscheduled_event_start | 0x40 | | Y |
| Unscheduled_event_end | 0x41 | | Y |

FIG. 2

SYSTEMS AND METHODS FOR CONTROLLING CLIENT BEHAVIOR IN ADAPTIVE STREAMING

CROSS-REFERENCE TO RELATED APPLICATIONS

The present application claims the benefit of U.S. Provisional Patent Application No. 61/638,276 filed Apr. 25, 2012 and entitled "System and Method for Controlling Client Behavior in Adaptive Streaming," which is incorporated herein by reference as if reproduced in its entirety.

TECHNICAL FIELD

The present invention relates to systems and methods for media streaming and, in particular embodiments, to systems and methods for controlling client behavior.

BACKGROUND

Targeted advertisement is a major revenue source for the cable/Internet Protocol television (IPTV) industry. In order to achieve a more localized advertisement, ad insertion markup for the Motion Picture Experts Group (MPEG)-2 transport stream (TS) was standardized in the Society of Cable Telecommunications Engineers SCTE 35 standard.

SCTE 35 is very widely used in the cable and IPTV industry to mark ad insertion points. The edge equipment uses these points to replace parts of the original content with an appropriate advertisement during the scheduled ad breaks. Recently, there has been a trend to use the SCTE 35 segmentation_descriptor for reporting various stream events (such as program changes) to the downstream equipment.

SUMMARY OF THE INVENTION

In accordance with an embodiment, a method for controlling end client behavior in dynamic adaptive streaming over hypertext transfer protocol (HTTP) (DASH) includes receiving at the end client a DASH Motion Picture Experts Group (MPEG)-2 transport stream (TS) segment, wherein the DASH MPEG-2 TS segment, which includes a segmentation descriptor, such as a SCTE 35 splice_info_section section, which includes, for example, at least one SCTE 35 command descriptor, and performing, with the end client, an action indicated by the segmentation descriptor.

In accordance with another embodiment, a network component configured for controlling end client behavior in dynamic adaptive streaming over hypertext transfer protocol (HTTP) (DASH) includes a processor and a computer readable storage medium storing programming for execution by the processor, the programming including instructions to: receive a DASH MPEG-2 TS segment, wherein the DASH MPEG-2 TS segment includes a segmentation descriptor, and perform an action indicated by the segmentation descriptor.

In accordance with another embodiment, a method for controlling end client behavior in dynamic adaptive streaming over hypertext transfer protocol (HTTP) (DASH) includes receiving at the end client a DASH MPEG-2 TS segment, wherein the DASH MPEG-2 TS segment includes a command, determining with the end client a type of command, and executing, with end the client, an action in accordance with the type of command.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 is a table illustrating segmentation events and associated actions according to an embodiment;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

While terminology defined in International Organization for Standardization (ISO)/International Electrotechnical Commission (IEC) 23009-1 is used to illustrate embodiments below, the same concepts also apply to Apple hypertext transfer protocol (HTTP) live streaming (HLS), though with different names.

In cases of digital program insertion, content (and possibly its characteristics and source) generally will change unexpectedly. An example of such a scenario is a transition from a TV program to an advertisement. Other possible scenarios triggering such behavior may be blackouts and emergency alerts. This will result in the content generation system triggering an event (e.g., a manifest reload). There is no current mechanism in TS-based dynamic adaptive streaming over HTTP (DASH) that allows this.

An embodiment uses SCTE 35 for controlling client behavior in adaptive streaming based on MPEG-2 TS. An embodiment provides client-side use of SCTE 35 in adaptive streaming. An embodiment modifies adaptive bit rate (ABR) client behavior as a response to SCTE 35 messages. An embodiment provides cloud delivery networks (CDNs) and edge equipment the ability to handle schedule changes in live broadcast events with low latency. An embodiment provides an ABR client response to unexpected events occurring during broadcast. Embodiments may be applied to cable/IPTV/telecommunication systems and devices, and to CDN systems and devices.

Figure 1:
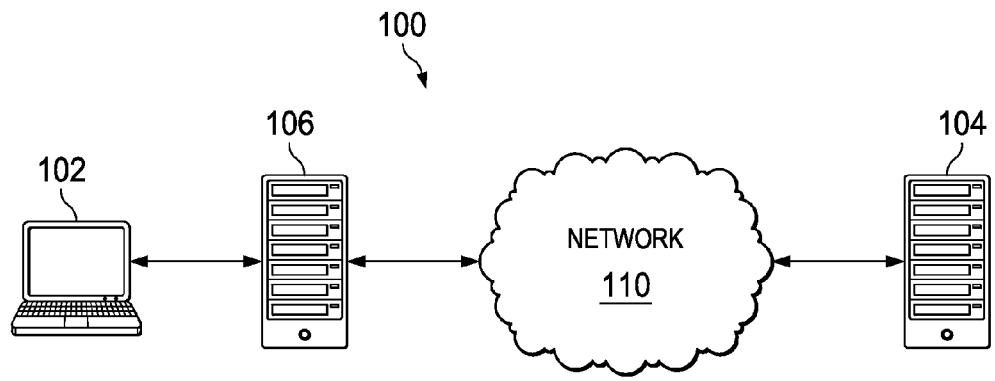
FIG. 1 illustrates an embodiment system for controlling client behavior in adaptive streaming.

FIG. 1 illustrates an embodiment system 100 for controlling client behavior in Adaptive Streaming. System 100 includes a client 102, a media source server 104, an Internet Service Provider (ISP) server 106, and a network 110. Network 110 may include switches, routers, communication channels, and other devices configured to transmit data from one part of the network 110 to another part of the network 110. The network 110 may include wired and wireless transmission means. The client 102, media source server 104, and the ISP server 106 are connected to the network 110 and configured to transmit and received data over the network 110. The client 102 may be any type of user equipment (UE) including, for example, a personal computer, a laptop computer, a tablet computer, a smart phone, a personal digital assistant, etc. In an embodiment, the client 102 may be a television coupled to a data processing system to receive IPTV or may be a television coupled to a cable or satellite provider set top box. The system 100 may include other network components in addition to those depicted in FIG. 1.

The media source server 104 is configured to store media and transmit media streams to the client 102 via the network 110. The media streams may include media stream segments. The types of media may include video and audio. The media segments include indicators, signals, or descriptors describing an upcoming change in the media stream. The indicators or signals may indicate that part of the original content is to be replaced by the ISP server 106 with alternate content at a scheduled time. The alternate content may include appropriate advertising during scheduled advertising breaks. In an embodiment, the advertisement are targeted advertisements based on some aspect of the client 102 (e.g., location, user demographic, etc.). The media stream includes DASH MPEG-2 TS segments in an embodiment. An MPEG-2 TS segment includes MPEG-2 TS packets. Some packets carry SCTE 35 splice_info_section sections. SCTE 35 commands and the appropriate descriptors are carried within these sections. Depending on the type of indicator, signal, or descriptor, an event is triggered in the client 102. In an embodiment, the client 102 requests a new manifest from the ISP server 106 when it encounters an indicator or signal indicating that a change in the content in the media stream is upcoming. Without the indicators or signaling, the client 102 may need to periodically request new manifests since the client 102 would not be aware of when a new manifest would be needed. By signaling to the client 102 when the content will change, the client 102 uses fewer network communication resources since the client 102 does not need to request new manifests as often.

As described below, an embodiment specifies the way an ABR client receiving MPEG-2 TS segments reacts to SCTE 35 messages contained in those MPEG-2 TS segments. FIG. 2 is a table 200 illustrating segmentation events and associated actions according to an embodiment. In an embodiment, commands other than the ones specified below generally are ignored.

In an embodiment, SCTE 35 commands are interpreted as follows.

splice_schedule

Splice schedule generally should not be used with ABR streaming, as it duplicates part of the information that is found in a manifest. If encountered by a DASH client, the media presentation description (MPD) validity is changed to the earliest utc_time in the command, and consequently MPD is updated by that time.

splice_insert

If the segmentation_descriptor( )is present, the rules provided in FIG. 2 apply. Otherwise, the MPD validity is limited by the time appearing in splice_time( ), unless splice_immediate_flag is 1, in which case an MPD update is triggered immediately.

time_signal

In an embodiment, this is ignored unless the segmentation_descriptor is present, where the rules provided in FIG. 2 apply.

SCTE 35 descriptors are interpreted as follows.

avail_descriptor

The avail descriptor may be used by the client for identification of the avail. Generally, no specific action is required from the client.

DMTF_descriptor

DMTF_descriptor generally should not be used and can be ignored.

segmentation_descriptor

Most SCTE 35 segmentation events represent a change of content. While expected events, such as placement opportunity, can be anticipated and accommodated via placement opportunity periods, unexpected events (e.g., early termination) generally mean that the remaining periods may be invalid, or their timing may be invalid.

In an embodiment, If an SCTE 35 command is present anywhere in a media segment, it shall also be present at the beginning of this segment.

When a MPEG-2 TS Media Segment carries an SCTE 35 splice_insert( ) command, or a time_signal( ) command carrying a segmentation_descriptor with segmentation-_type_id value greater than 0x10, and the splice_time( ) of that command has a value smaller than the earliest presentation time of the next segment, this Media Segment is the last Media Segment in the Representation.

If splice_time( ) of the command has a value larger than the earliest presentation time of the next media segment, it shall be treated as an advisory (e.g., causing an MPD update in the period between the successful parsing of this packet and the corresponding splice_time( ).

The table illustrated in FIG. 2 specifies the action triggered by each type of segmentation event according to an embodiment. If the splice time associated with this descriptor is in the future, the period will end and the MPD reloaded at that time. Reloading the MPD generally avoids possible race conditions.

If the delivery_check_flag value is 0 (per SCTE 35), MPD reload occurs immediately, or at the time indicated by splice_time.

Figure 3:
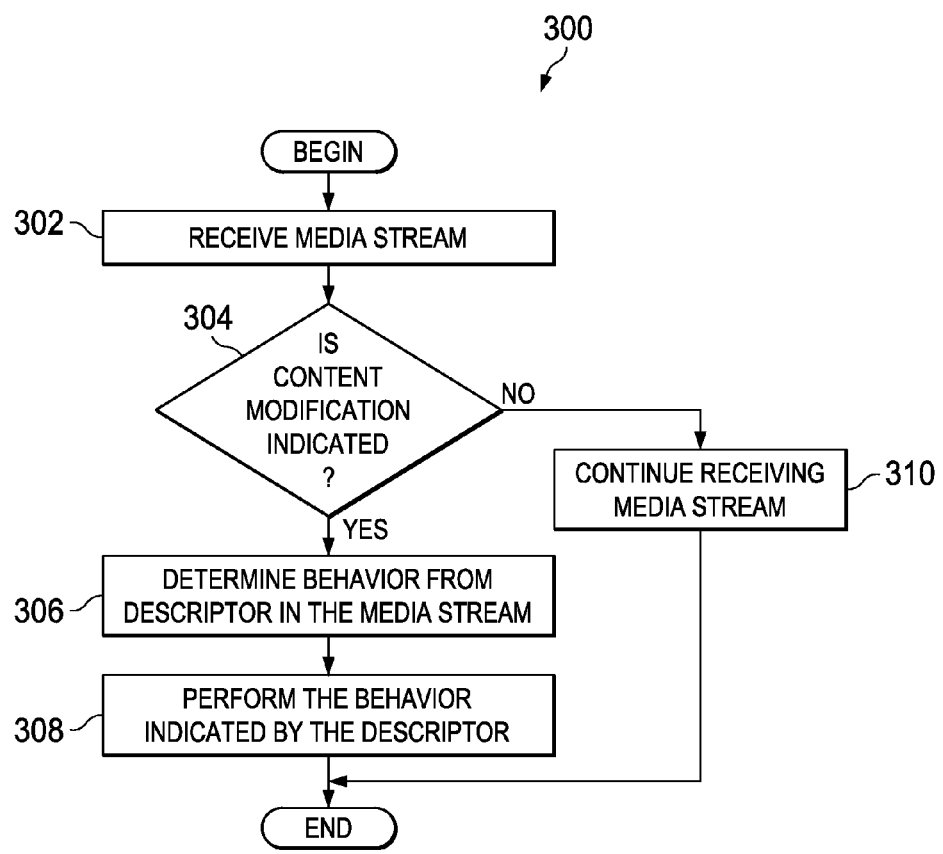
FIG. 3 is a flowchart of an embodiment method for controlling client behavior in adaptive streaming.

FIG. 3 is a flowchart of an embodiment method 300 for controlling client behavior in adaptive streaming. The method 300 may begin at block 302 where the client receives an ABM media stream segment. At block 304, the client determines whether content modification is indicated by the descriptor in the media stream segment. If not, then the method 300 proceeds to block 310 where the client continues receiving the media stream segment, after which, the method 300 may end. If, at block 304, content modification is indicated by the descriptor, then the method 300 proceeds to block 306 where the client determines the behavior indicated by the descriptor (e.g., determines the type of command) in the media stream segment. At block 308, the client performs the behavior indicated by the descriptor, after which, the method 300 may end.

Figure 4:
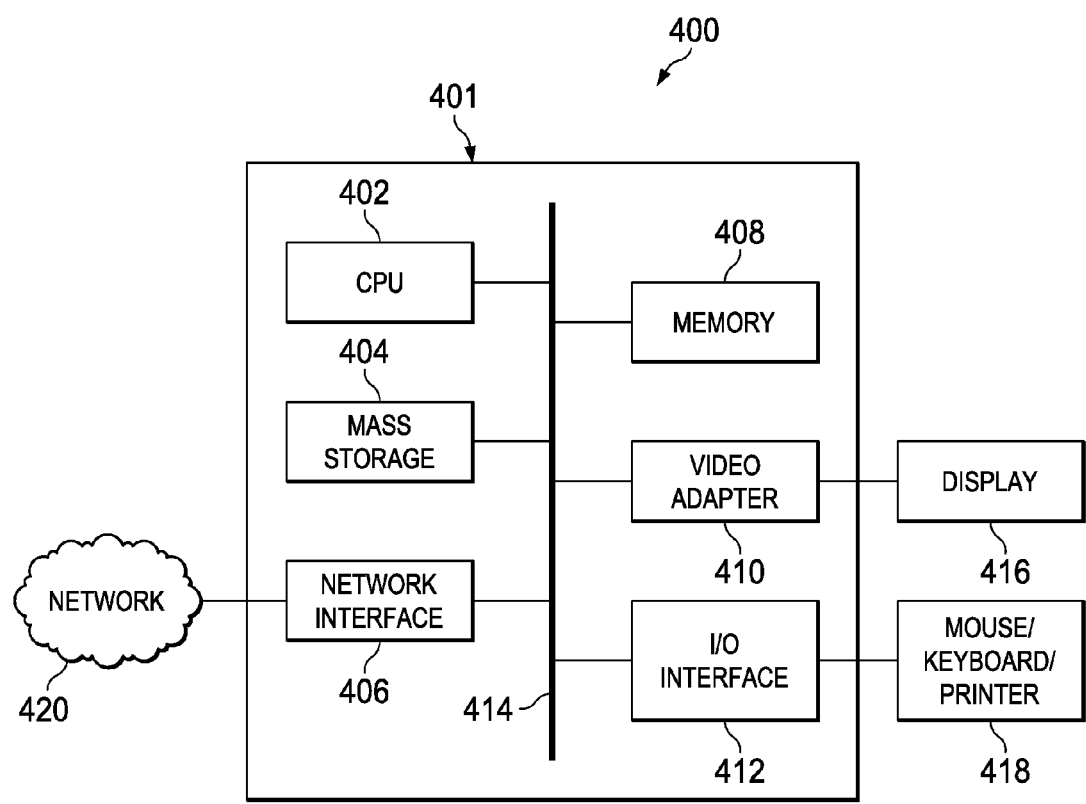
FIG. 4 is a processing system that can be used to implement various embodiments.

FIG. 4 is a block diagram of a processing system 400 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may include a processing unit 401 equipped with one or more input/output devices, such as a speaker, microphone, mouse, touchscreen, keypad, keyboard, printer, display, and the like. The processing unit may include a central processing unit (CPU) 402, memory 408, a mass storage device 404, a video adapter 410, and an I/O interface 412 connected to a bus 414.

The bus 414 may be one or more of any type of several bus architectures including a memory bus or memory controller, a peripheral bus, video bus, or the like. The CPU 402 may include any type of electronic data processor configured to execute programming instructions. The memory 408 may include any type of system memory such as static random access memory (SRAM), dynamic random access memory (DRAM), synchronous DRAM (SDRAM), read-only memory (ROM), a combination thereof, or the like. In an embodiment, the memory 408 may include ROM for use at boot-up, and DRAM for program and data storage for use while executing programs.

The mass storage device 404 may include any type of storage device (e.g., computer readable storage medium) configured to store data, programs for execution by the CPU 402, and other information and to make the data, programs, and other information accessible via the bus 414. The mass storage device 404 may include, for example, one or more of a solid state drive, hard disk drive, a magnetic disk drive, an optical disk drive, or the like.

The video adapter 410 and the I/O interface 412 provide interfaces to couple external input and output devices to the processing unit 401. As illustrated, examples of input and output devices include the display 416 coupled to the video adapter 410 and the mouse/keyboard/printer 418 coupled to the I/O interface 412. Other devices may be coupled to the processing unit 401, and additional or fewer interface cards may be utilized. For example, a serial interface such as Universal Serial Bus (USB) (not shown) may be used to provide an interface for a printer.

The processing unit 401 also includes one or more network interfaces 406, which may include wired links, such as an Ethernet cable or the like, and/or wireless links to access nodes or different networks 420. The network interface 406 allows the processing unit 401 to communicate with remote units via the networks 420. For example, the network interface 406 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for controlling end client behavior in dynamic adaptive streaming over hypertext transfer protocol (HTTP), the method comprising:
   receiving, at the end client, a media stream including a DASH Motion Picture Experts Group (MPEG)-2 transport stream (TS) segment, wherein the DASH MPEG-2 TS segment includes a segmentation descriptor, the segmentation descriptor describing an upcoming change in subsequent segments of the media stream, and the segmentation descriptor including a splice time; and
   performing, with the end client, an action indicated by the segmentation descriptor, wherein the action comprises a media presentation description (MPD) reload, wherein a timing of performing the MPD reload is determined according to the segmentation descriptor, wherein the MPD validity is limited by the splice time, and wherein the MPD is updated in a period between a successful parsing of a packet and the splice time when the splice time has a value larger than an earliest presentation time of a next media segment.

2. The method of claim 1, wherein the segmentation descriptor conforms to one of a Society of Cable Telecommunications Engineers (SCTE) 35 protocol and a HTTP live streaming (HLS) protocol.

3. The method of claim 1, wherein the MPD reload occurs immediately when a delivery check flag value in the TS is zero.

4. The method of claim 1, wherein the MPD reload occurs at a time specified by a splice time in the TS.

5. The method of claim 1, wherein the action comprises an end of period.

6. The method of claim 1, wherein the SCTE 35 command descriptor comprises one of a program early termination command, a program breakaway command, a program resumption command, a program runover unplanned command, an unscheduled event start command, and an unscheduled event end command and the action comprises a media presentation description (MPD) reload.

7. The method of claim 1, wherein the SCTE 35 command descriptor comprises one of a program start command, a program end command, a chapter start command, a chapter end command, a provider advertisement start command, a provider advertisement end command, a distributor advertisement start command, a distributor advertisement end command, a placement opportunity start command, a placement opportunity end command and the action comprises an end of period.

8. The method of claim 1, wherein the action includes adaptive bit rate (ABR) end client behavior.

9. A network component configured for controlling end client behavior in dynamic adaptive streaming over hypertext transfer protocol (HTTP) (DASH), comprising:
   a processor; and
   a non-transitory computer readable storage medium storing programming for execution by the processor, the programming including instructions to:
   receive a media stream including a DASH Motion Picture Experts Group (MPEG)-2 transport stream (TS) segment, wherein the DASH MPEG-2 TS segment includes a segmentation descriptor, the segmentation descriptor describing an upcoming change in subsequent segments of the media stream, and the segmentation descriptor including a splice time; and
   perform an action indicated by the segmentation descriptor, wherein the action comprises a media presentation description (MPD) reload, wherein a timing of performing the MPD reload is determined according to the segmentation descriptor, wherein the MPD validity is limited by the splice time, and wherein the MPD is updated in a period between a successful parsing of a packet and the splice time when the splice time has a value larger than an earliest presentation time of a next media segment.

10. The network component of claim 9, wherein the segmentation descriptor conforms to one of a Society of Cable Telecommunications Engineers (SCTE) 35 protocol and a HTTP live streaming (HLS) protocol.

11. The network component of claim 9, wherein the MPD reload occurs immediately when a delivery check flag value is zero.

12. The network component of claim 9, wherein the MPD reload occurs at a time specified by a splice time.

13. The network component of claim 9, wherein the action comprises an end of period.

14. The network component of claim 9, wherein the segmentation descriptor comprises one of a program early termination command, a program breakaway command, a program resumption command, a program runover unplanned command, an unscheduled event start command, and an unscheduled event end command and the action comprises a media presentation description (MPD) reload.

15. The network component of claim 9, wherein the segmentation descriptor comprises one of a program start command, a program end command, a chapter start command, a chapter end command, a provider advertisement start command, a provider advertisement end command, a distributor advertisement start command, a distributor advertisement end command, a placement opportunity start command, a placement opportunity end command and the action comprises an end of period.

16. A method for controlling end client behavior in dynamic adaptive streaming over hypertext transfer protocol (HTTP) (DASH), the method comprising:

receiving, at the end client, a media stream including a DASH Motion Picture Experts Group (MPEG)-2 transport stream (TS) segment, wherein the DASH MPEG-2 TS segment includes a command, the command describing an upcoming change in subsequent segments of the media stream, and the command including a splice time;

determining, with the end client, a type of command; and executing, with the end client, an action in accordance with the type of command, wherein the action comprises a media presentation description (MPD) reload, wherein a timing of performing the MPD reload is determined according to the segmentation descriptor, wherein the MPD validity is limited by the splice time, and wherein the MPD is updated in a period between a successful parsing of a packet and the splice time when the splice time has a value larger than an earliest presentation time of a next media segment.

17. The method of claim 16, wherein the command conforms to one of a Society of Cable Telecommunications Engineers (SCTE) 35 protocol and a hypertext transfer protocol (HTTP) live streaming (HLS) protocol.

18. The method of claim 16, wherein the MPD reload occurs immediately when a delivery check flag value in the TS is zero.

19. The method of claim 16, wherein the MPD reload occurs at a time specified by a splice time in the TS.

20. The method of claim 16, wherein the action comprises an end of period.

* * * * *